United States Patent
Nishimura et al.

(10) Patent No.: US 8,037,963 B2
(45) Date of Patent: Oct. 18, 2011

(54) HYBRID WORKING VEHICLE

(75) Inventors: Satoru Nishimura, Hiratsuka (JP); Hikosaburou Hiraki, Oyama (JP)

(73) Assignee: Komatsu Ltd., Tokyo (JP)

( * ) Notice: Subject to any disclaimer, the term of this patent is extended or adjusted under 35 U.S.C. 154(b) by 356 days.

(21) Appl. No.: 12/376,106

(22) PCT Filed: Jan. 30, 2007

(86) PCT No.: PCT/JP2007/051481
§ 371 (c)(1),
(2), (4) Date: Feb. 2, 2009

(87) PCT Pub. No.: WO2008/015798
PCT Pub. Date: Feb. 7, 2008

(65) Prior Publication Data
US 2009/0199553 A1 Aug. 13, 2009

(30) Foreign Application Priority Data
Aug. 2, 2006 (JP) .................. 2006-211006

(51) Int. Cl.
*B60K 1/04* (2006.01)

(52) U.S. Cl. ...................... 180/291; 180/68.2

(58) Field of Classification Search .......... 180/291, 180/65.31, 68.1, 68.2, 68.4, 68.6; 903/903, 903/907, 952
See application file for complete search history.

(56) References Cited

U.S. PATENT DOCUMENTS

| | | | | |
|---|---|---|---|---|
| 4,422,572 A * | 12/1983 | Sakurai et al. | ........... | 237/12.3 B |
| 5,504,655 A * | 4/1996 | Underwood et al. | ......... | 361/707 |
| 6,678,972 B2 * | 1/2004 | Naruse et al. | .................. | 37/466 |
| 6,745,860 B2 * | 6/2004 | Yabe | ............................ | 180/68.1 |
| 6,820,866 B2 * | 11/2004 | Mason | .......................... | 267/122 |
| 7,079,379 B2 * | 7/2006 | Yamaguchi et al. | .......... | 361/676 |
| 7,134,518 B2 * | 11/2006 | Arai et al. | .................... | 180/68.1 |
| 7,703,730 B2 * | 4/2010 | Best et al. | ................ | 248/220.22 |

FOREIGN PATENT DOCUMENTS

| | | |
|---|---|---|
| JP | 08-126346 A | 5/1996 |
| JP | 2004-169464 A | 6/2004 |
| JP | 2004-169466 A | 6/2007 |

OTHER PUBLICATIONS

English Language International Preliminary Report on Patentability dated Apr. 16, 2009, issued in counterpart International Application No. PCT/JP2007/051481.

English Language International Search Report dated Mar. 6, 2007 issued in parent Appln. No. PCT/JP2007/051481.

* cited by examiner

*Primary Examiner* — John Walters
(74) *Attorney, Agent, or Firm* — Holtz, Holtz, Goodman & Chick, P.C.

(57) ABSTRACT

An engine room is divided into a left room and a right room by a cooling unit. An intake chamber is disposed at a left side and an engine and the like are disposed at a right side. A cooling heat sink is provided on a side of the intake chamber, and a storage and a controller for controlling hybrid electronic devices are formed in this order in a cooling heat sink. Further, a cooling pump for supplying cooling liquid to the cooling heat sink is provided in the intake chamber. A radiator for cooling the cooling liquid is provided in front of the cooling unit.

15 Claims, 11 Drawing Sheets

HYBRID WORKING VEHICLE

This application is a U.S. National Phase Application under 35 USC 371 of International Application PCT/JP2007/051481 filed Jan. 30, 2007.

TECHNICAL FIELD

The present invention relates to a hybrid working vehicle, and particularly to a hybrid working vehicle having a distinguishing arrangement structure of components for a hybrid system.

BACKGROUND ART

In recent years, a hybrid working vehicle employing both an engine and a generator-motor (also called as a motor-generator) has been used as a working vehicle such as a construction machine, a civil engineering machine, an agricultural machine, a delivery vehicle, or a traveling vehicle. In many cases, a hybrid working vehicle has an arrangement in which an engine is transversely disposed in a rear portion of an upper surface of a swinging frame.

For such hybrid working vehicle in which an engine is transversely disposed, an arrangement structure of devices for a construction machine in which storage-related devices are provided in front of a swinging frame has been suggested (see Patent Document 1). Also, a hybrid construction machine having an arrangement in which an inverter for converting electric power for a battery is provided in an intake chamber of an engine room, in addition to an arrangement in which a battery is provided in front of a swinging frame as described above, has been suggested (see Patent Document 2).

Figure 10:
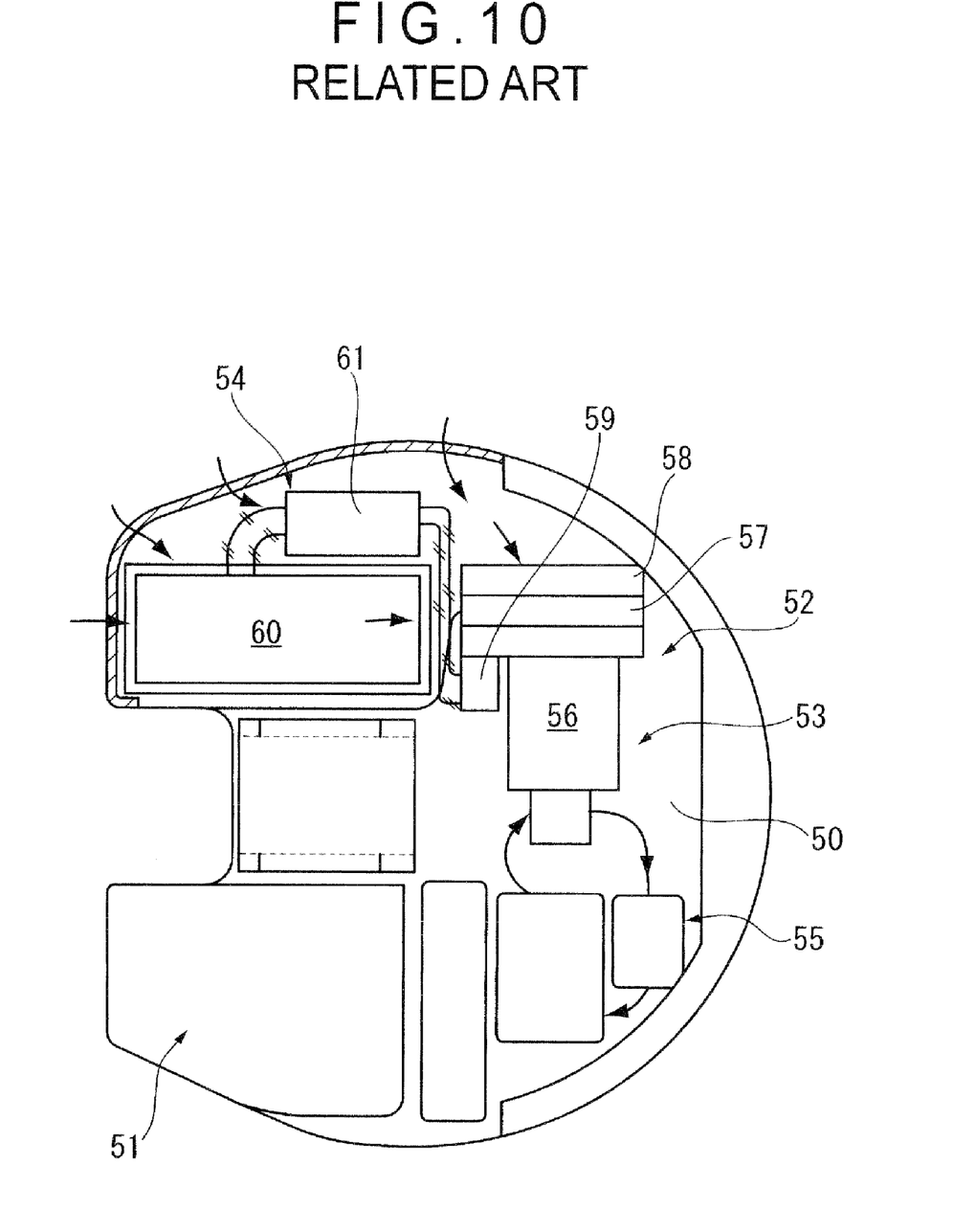
FIG. 10 is a plan view illustrating an arrangement structure of devices (related art 1).

FIG. 10 is a plan view illustrating the arrangement disclosed in Patent Document 1 as a related art 1 of the invention. As shown in FIG. 10, an engine room 52 is provided to house an engine 56 and engine-related devices 53 in a rear portion of an upper swing body frame 50. Also, storage-related devices 54 are provided at a right side in a front portion of the upper swing body frame 50, and high-pressure hydraulic devices 55 are provided at a left side of the rear portion of an operation room 51.

The storage-related device 54 includes a generator-motor 59 that works as a generator during regeneration and works as a motor when a driving torque of the engine 56 is not sufficient, a storage 60 that stores regenerating energy generated by a generator-motor 59 and supplies driving energy to the generator-motor 59, and an inverter 61 that controls the generator-motor 59.

As the storage 60, for example, a high-capacity capacitor capable of repeating charge and discharge at a high speed, a lithium ion battery or the like is used.

Figure 11:
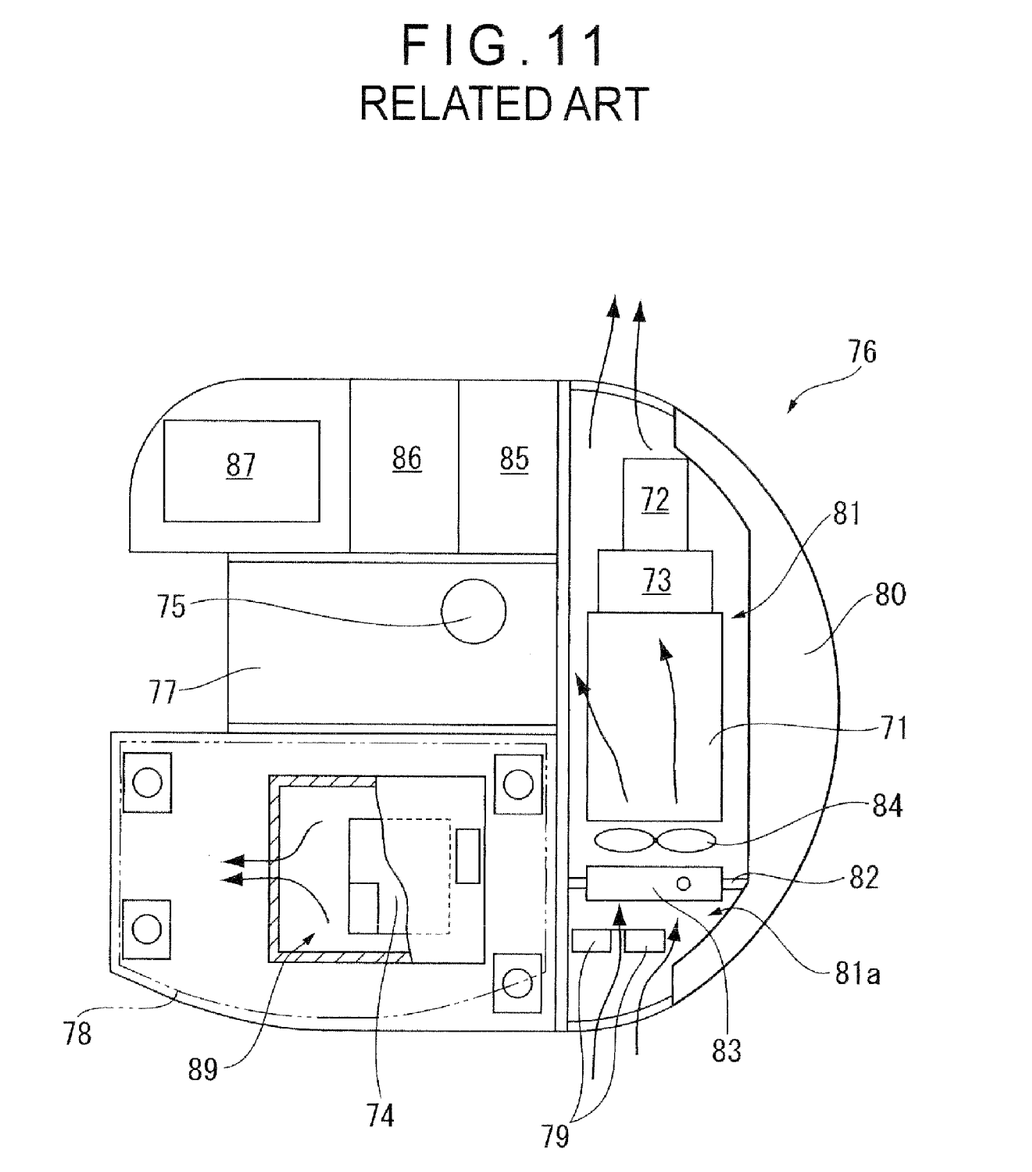
FIG. 11 is a plan view illustrating an arrangement structure of devices (related art 2).

FIG. 11 is a plan view illustrating a cooling device disclosed in Patent Document 2 as a related art 2 of the invention. As shown in FIG. 11, a revolving frame 77 is provided as an upper swing body frame in a lower portion of an upper swing body 76 which is swingable on a lower traveling body of a hydraulic excavator. An operation room 78 is mounted on the revolving frame 77 as shown at a left side in a front portion. An engine room 81 is provided to be surrounded by an engine hood (not shown) and a counterweight 80 in a rear portion.

A radiator 83, a cooling fan 84, an engine 71, a generator-motor 73 and a hydraulic pump 72 are arranged in this order from a left side in the engine room 81. The engine room 81 is divided by a partition 82 extending along the radiator 83, and an intake chamber 81a is provided in the engine room 81 on a left side of the radiator 83. Inverters 79 are provided for controlling the generator-motor 73 in the intake chamber 81a.

A hydraulic oil tank 85, a fuel tank 86, and an operation valve 87 are arranged at right side in a front portion of the upper swing body 76. A motor 75 for swing is mounted in a central portion of the upper swing body 76. The operation room 78 is provided at a left side of the front portion of the upper swing body 76 and a battery housing 89 is provided on the revolving frame 77 at a lower side of the operation room 78. A battery 74 is accommodated the a battery housing 89 and cooling air of an air conditioner for cooling the operation room 78 is sucked into the battery housing 89, so that the battery 74 can be cooled down.

Patent Document 1: JP-A-2004-169466
Patent Document 2: JP-A-2002-227241

DISCLOSURE OF THE INVENTION

Problems to Be Solved by the Invention

In the hybrid working vehicle, it is necessary that the storage for storing electric power generated by the generator-motor, the controller for controlling a motor drive of the hybrid working vehicle and the like are provided. Mounting positions of such devices cause a problem.

A new appropriate design suitable to the hybrid working vehicle can lead to a layout arrangement suitable to the hybrid working vehicle. However, as compared with a conventional working vehicle, a manufacturing cost of the hybrid working vehicle has been increased in order to arrange a generator-motor, a motor, a controller therefor, a cooling circuit therefor and the like.

Further, when a new design suitable to the hybrid working vehicle is made, a conventional frame structure and the like for the conventional working vehicle cannot be used, which makes it difficult to reduce the manufacturing cost.

Thus, to reduce the increased manufacturing cost, it has been required to effectively use an arrangement of the conventional working vehicle and appropriately combine the arrangement of the conventional working vehicle with the arrangement of the hybrid working vehicle.

Patent Documents 1 and 2 disclose using a part of the arrangement of the conventional working vehicle. However, since the storage and the generator-motor are spaced away from each other, a connected line between the storage and the generator-motor needs to be long. Especially, in the arrangement of the devices as disclosed in Patent Document 1, the line is relatively shortened. However, since the storage is disposed in a separate chamber from an engine room, shortening of the line is limited.

The line has been desired to be shortened because electric power loss is undesirably increased when the line is long.

Patent Document 1 only discloses that a wind flow caused by suction of a fan disposed in a shroud 57 is used for cooling the storage-related devices 54. Further, since a position of the fan is far from a position of the storage-related devices 54, it is difficult to effectively cool the storage-related devices 54.

Patent Document 2 discloses that the cooling air of the air conditioner for cooling the operation room 78 is used. Although the battery 74 can be effectively cooled down at this time, the cooling air needs to be sent from the air conditioner all the time for cooling the battery 74.

The invention has been directed to overcoming the problems as described above and an object of the invention is therefore to provide a hybrid vehicle in which a wiring to connect a storage and a generator-motor can be shortened and the storage can be effectively cooled down.

Means for Solving the Problems

An object of the invention has been achieved as described below.

A hybrid working vehicle according to an aspect of the invention in which an engine is transversely disposed, includes: a power unit including the engine, a generator-motor and a main hydraulic pump, the generator-motor and the main hydraulic pump being disposed in the engine; and a storage for storing electric power generated by the generator-motor provided on at least one of a side close to the engine of the power unit and a side close to the main hydraulic pump of the power unit.

According to the aspect of the invention, since the storage for storing electric power generated by the generator-motor is provided on at least one of the side close to the engine of the power unit and the side close to the main hydraulic pump of the power unit, a connected wiring between the generator-motor and the storage can be shortened. Thus, electric power loss in the connected wiring can be reduced. Further, since the hybrid working vehicle can be operated with a reduced power loss, the working efficiency of the hybrid working vehicle can be improved.

When the storage is provided on the side close to the engine of the power unit, the storage can be provided close to an air flow caused by suction of a cooling fan for cooling a radiator and the like. Thus, the storage can be effectively cooled by using the air flow. Further, since the storage can be provided in a place where the air flow that is delivered into the radiator and the like is only slightly disturbed, the cooling efficiency of the radiator and the like is not lowered.

When the storage is provided on the side close to the main hydraulic pump of the power unit, the storage can be provided in a space formed in a lower portion of the main hydraulic pump. Also, when storages are respectively provided both on the side close to the engine of the power unit and on the side close to the main hydraulic pump of the power unit, a great capacity can be obtained.

According to the aspect of the invention, an arrangement structure of the power unit is specified.

Further, an arrangement structure of an electronic unit is also specified. The storage and a controller for controlling a motor drive of the hybrid working vehicle may be integrated together to form the electronic unit.

According to the aspect of the invention, a cooling structure of the electronic unit is specified.

A cooling pump for supplying the cooling liquid to the electronic unit may be provided in an engine room.

Further, the electronic unit or an assembly of the electronic unit and the cooling pump according to the aspect of the invention may be supported by a buffering member.

According to the aspect of the invention, an arrangement structure of the radiator for cooling the electronic unit is specified.

An arrangement structure of the cooling unit is specified in which the radiator for cooling the electronic unit and cooling devices such as an oil cooler for a hydraulic line may be integrated together.

Arrangement structures of the power unit, the electronic unit, and the cooling unit are specified according to the aspect of the invention.

Further, an arrangement structure of the electronic unit in the upper swing body frame is specified.

Also, an object of the invention can be achieved by the following feature of the invention.

A hybrid working vehicle according to another aspect of the invention includes: an engine provided to be orthogonal to a main frame along a front-rear direction of the vehicle; a generator-motor and a main hydraulic pump provided in the engine; a cooling unit having cooling devices on a hydraulic line including the engine; a storage that stores electric power generated by the generator-motor; a controller that controls a motor drive of the hybrid working vehicle; a radiator that cools the storage and the controller; and a cooling fan that generates cooling air to blow the cooling unit and the radiator, in which the storage and the controller, the radiator, the cooling unit, the cooling fan, the engine, the generator-motor, and the main hydraulic pump are arranged in this order from an upper stream side of the cooling Further, an arrangement structure of the cooling fan provided between the cooling unit and the engine is specified.

BEST MODE FOR CARRYING OUT THE INVENTION

Embodiment(s) of the invention will be described below with reference to attached drawings. An arrangement of a hydraulic excavator which is one type of construction machines will be exemplified below as a hybrid working vehicle according to the invention. However, the hybrid working vehicle includes not only the hydraulic excavator, but also other construction machines, civil engineering machines, agricultural machines, traveling vehicles, delivery vehicles and the like Note that the invention is not limited to a shape and an arrangement structure as described below but includes other shapes and arrangement structures of the hybrid working vehicle as long as an object of the invention can be achieved. Thus, the invention is not limited to the following exemplary embodiments, and includes various modifications.

First Exemplary Embodiment

Figure 1:
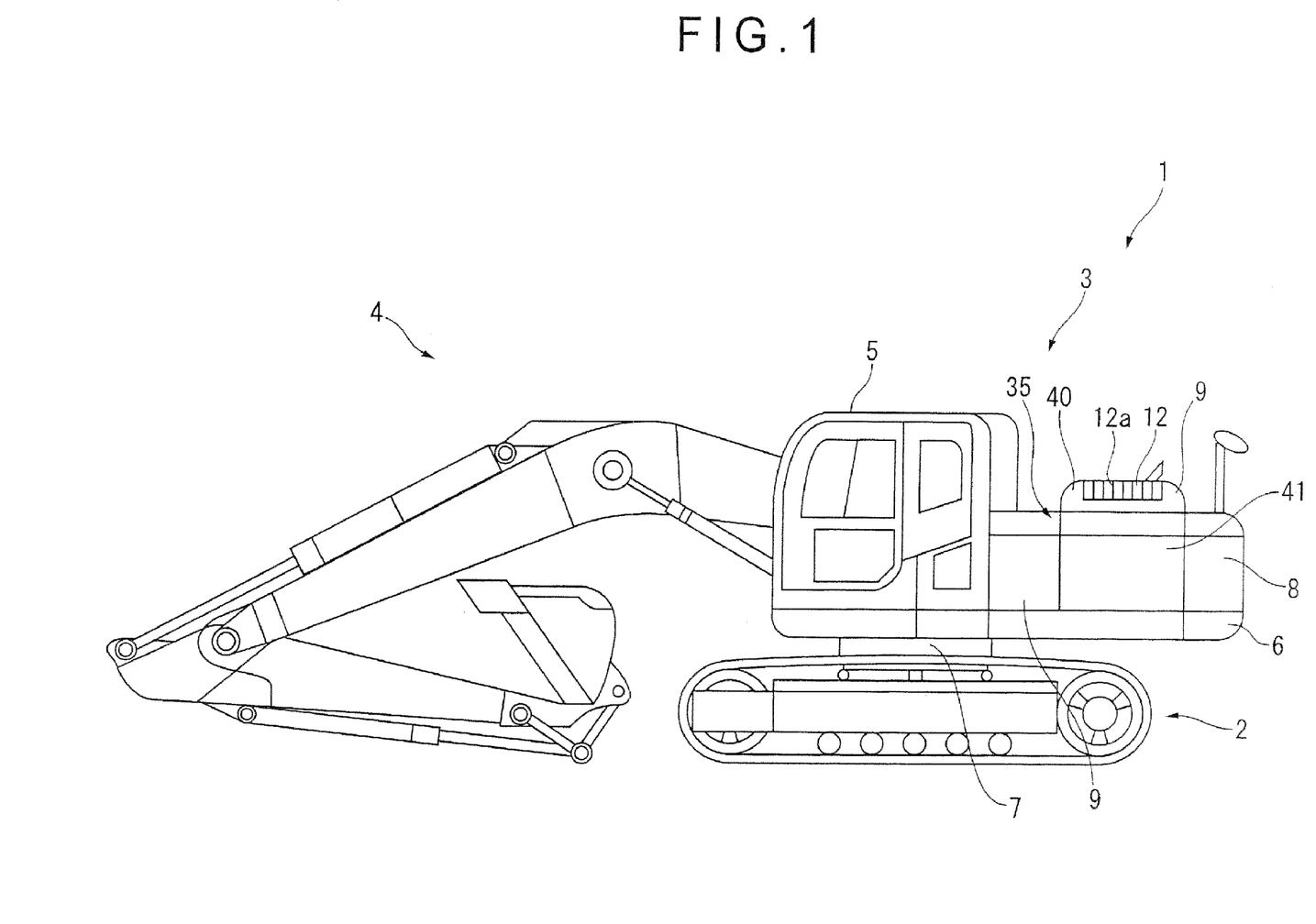
FIG. 1 is a perspective view illustrating a hybrid hydraulic excavator (exemplary embodiment).

The hybrid working vehicle according to an exemplary embodiment of the invention will be described below by exemplifying a hybrid hydraulic excavator with reference to FIG. 1. A hydraulic excavator 1 includes an swingable upper swing body 3 mounted on an upper portion of a lower traveling body 2 through a swing circle 7. The upper swing body 3 is swingably provided by a later-described swing motor 22 (see FIGS. 2 and 3).

An upper swing body frame 6 is provided on a bottom portion of the upper swing body 3. An outer cover 9 covering an engine room 35, a counterweight 8 forming the engine room 35 with the outer cover 9, an operation room 5, a working machine 4 and the like are mounted on the upper swing body frame 6. The outer cover 9 is directly attachable to a later-described outer frame 11 (see FIG. 5) through a bolt or the like.

An engine hood 40 is provided in a portion covering the engine room 35 as a part of the outer cover 9. A door 41 is openably and closably provided to check the inside of the engine room 35 in a part of the engine hood 40.

Although the engine hood 40 is provided in a portion covering the engine room 35 and formed of different components from components of the outer cover 9 in the figures, the engine hood 40 may be formed of the same components as those of the outer cover 9. Also, although the outer frame 11 is provided as a frame for attaching the outer cover 9 in the figures, the outer cover 9 is also used as a member for supporting a later-described cleaning unit 18.

An intake hole 12 for delivering outer air into the engine room 35 includes a plurality of intake openings formed on the engine hood 40 in an upper portion of the door 41. The intake hole 12 is sufficiently large for delivering the outer air into the engine room 35.

Also, an exhaust hole (not shown) is provided, for example, on the engine hood 40 on a side opposing to a side at which the intake hole 12 is formed, or on the upper swing body frame 6. Although the intake hole 12 is formed on the engine hood 40 according to the exemplary embodiment, the intake hole 12 may be formed on the door 41.

Figure 2:
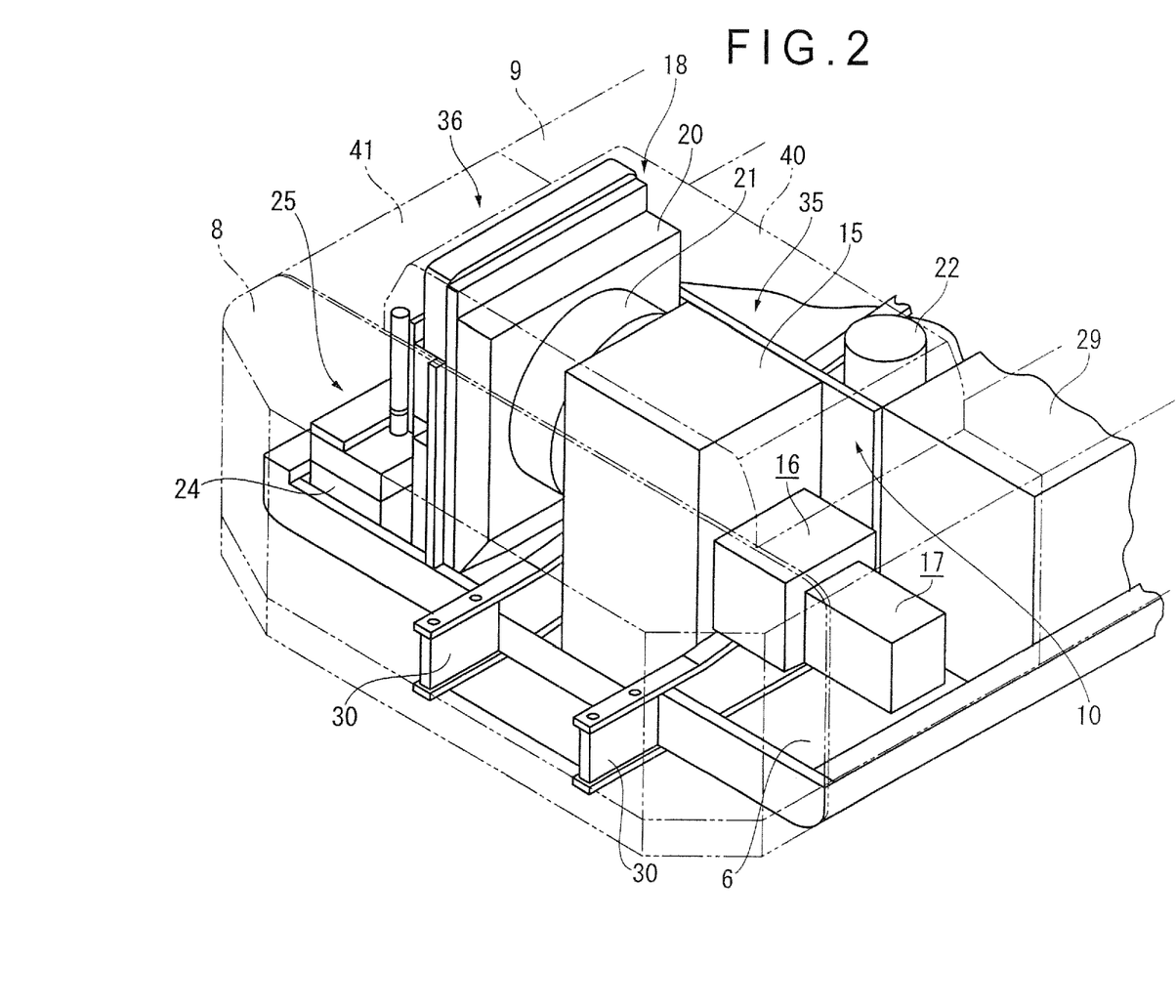
FIG. 2 is a schematic perspective view illustrating an engine room and vicinity of the engine room (exemplary embodiment 1).
Figure 3:
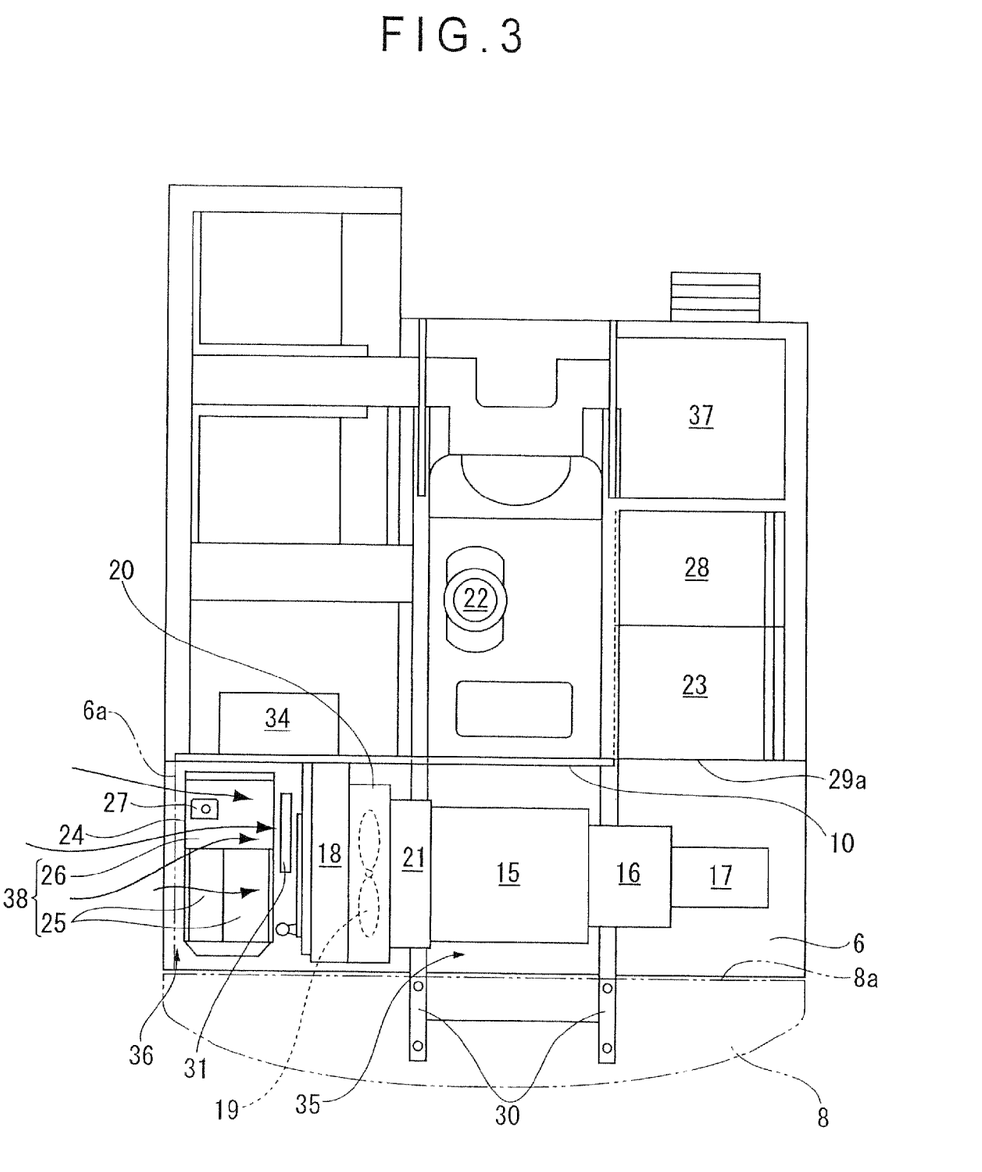
FIG. 3 is a schematic plan view illustrating members mounted on an upper swing body frame (exemplary embodiment 1).
Figure 4:
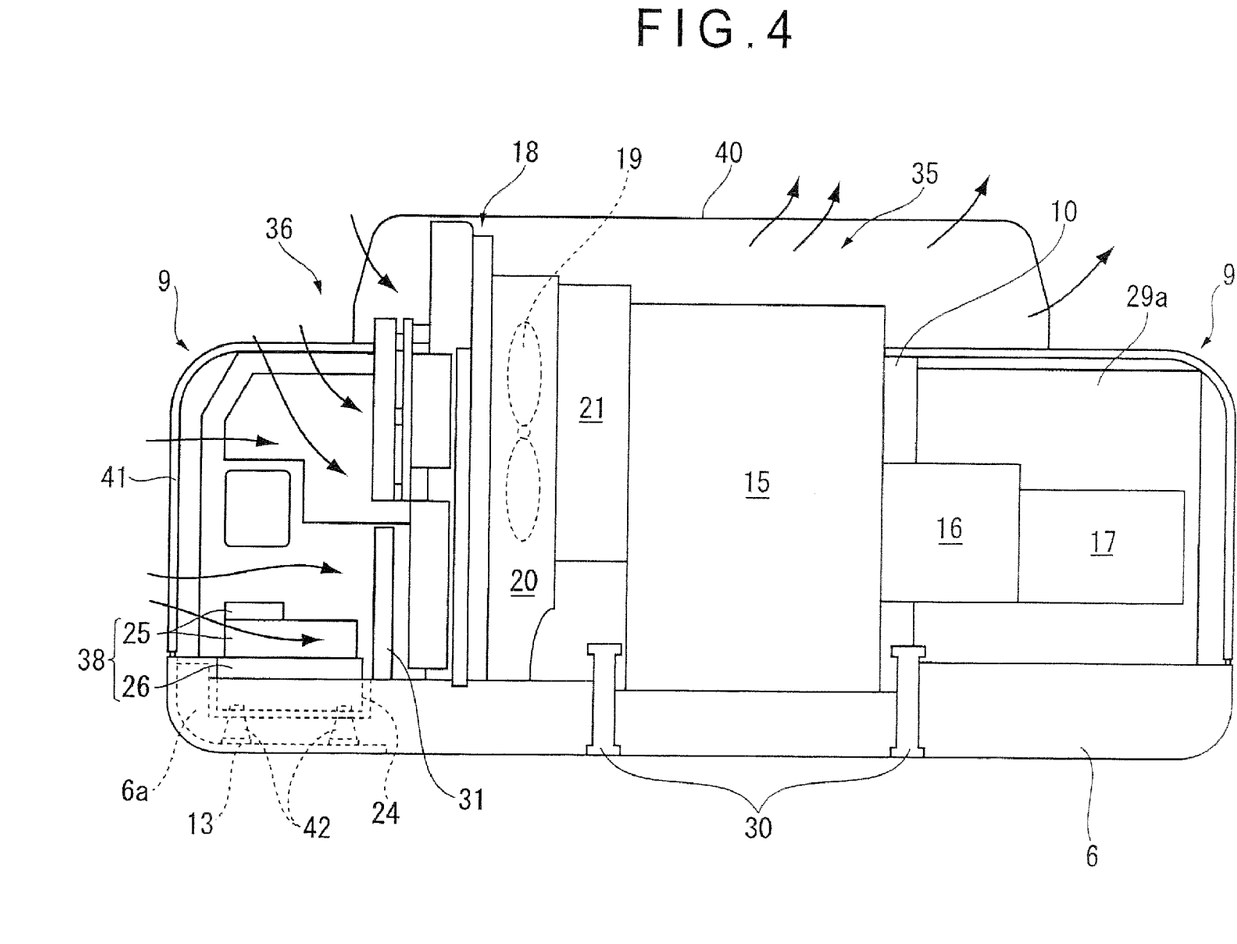
FIG. 4 is a schematic rear view illustrating the engine room (exemplary embodiment 1).

FIG. 2 is a schematic perspective view illustrating an arrangement structure of members in the engine room 35, and arrangement of components for a hybrid system, and the like, which are provided on the upper swing body frame 6. FIG. 3 is a schematic plan view illustrating members mounted on the upper swing body frame 6. FIG. 4 is a schematic rear view illustrating an arrangement structure of the engine room 35.

In FIG. 2, the counterweight 8, the engine hood 40 and the outer cover 9 are respectively shown as a two-dot chain phantom line. In FIG. 3, the counterweight 8 is shown as the two-dot chain phantom line. In FIGS. 3 and 4, a flow of outer air sucked in the engine room 35 is shown as an arrow. In FIGS. 2 to 4, wirings, pipes and the like are not shown.

As shown in FIGS. 2 and 3, a partition 10 provided on a front side of the hydraulic excavator 1 and an end surface of an oil tank 29 stand on one side of the engine room 35. A wall 8a of the counterweight 8 stands on the other side of the engine room 35. A partition member for partitioning the hybrid working vehicle into the front portion of the hybrid working vehicle and the engine room is provided by the partition 10 and the end surface of the oil tank 29.

The engine room 35 is divided into a left room and a right room by the cooling unit 18 as a wall of the engine. An intake chamber 36 is formed at a left side shown in FIG. 2 and a chamber for mounting the engine and the like are formed at a right side shown in FIG. 2. An engine 15, a generator-motor 16 and a main hydraulic pump 17 are arranged in line. A power unit is provided by the engine 15, the generator-motor 16 and the main hydraulic pump 17. The power unit is disposed between: the partition 10 and the end surface 29a of the oil tank 29; and the wall 8a of the counterweight 8.

Although an arrangement of the cooling unit 18 is not shown in detail in FIG. 3 which is the plan view, the cooling unit 18 includes cooling devices on a hydraulic line including the engine such as an engine radiator, an oil cooler, an outer cooler, and a fuel cooler horizontally arranged in parallel, with which a radiator for cooling a later-described electronic unit is integrated. The intake chamber 36 is provided in front of the cooling unit 18. Alternatively, the radiator for cooling the electronic unit and the cooling devices on the hydraulic line may be separately disposed in parallel.

A cooling fan 19 shown as a two-dot chain line in a shroud 20 is provided in the rear of the cooling unit 18. A wind tunnel 21 is connected to the shroud 20. Cooling air sucked by the cooling fan 19 is adjusted to flow straight by the wind tunnel 21, and intensively supplied to the power unit and the like arranged on a downstream side of the wind tunnel 21.

In stead of being linearly arranged with respect to the engine 15, the generator-motor 16 and the main hydraulic pump 17 may be separately or parallely arranged from the engine 15 via a belt driving unit or the like.

Cooling air discharged from the wind tunnel 21 cools the power unit including the engine 15, the generator-motor 16 and the main hydraulic pump 17 and the like. Then, the cooling air is discharged to the outside from an exhaust hole (not shown) of the outer cover 9, which is arranged at a right side of FIG. 2, or an exhaust hole formed in a lower portion of the engine 15, the generator-motor 16, the main hydraulic pump 17 or the like.

Figure 5:
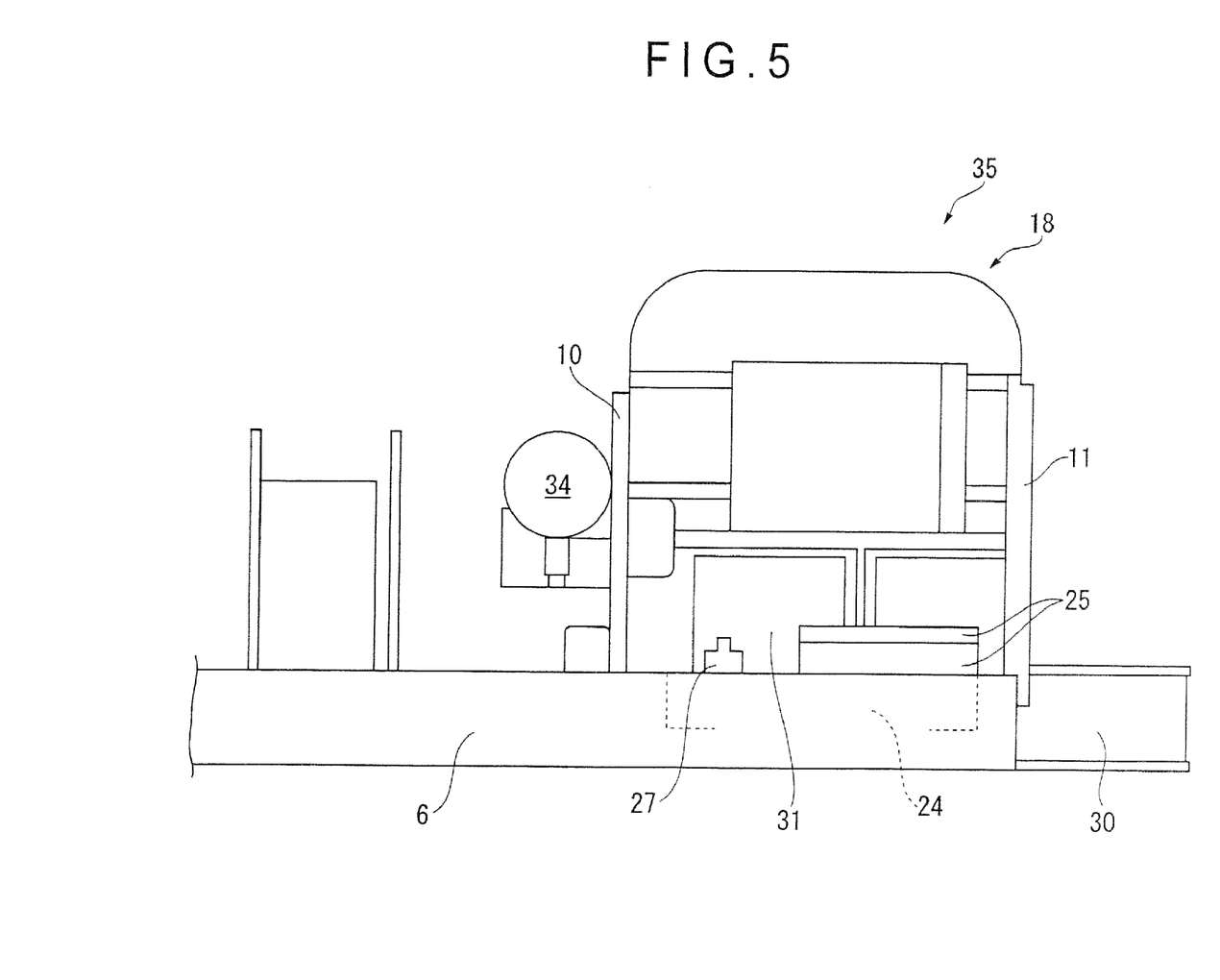
FIG. 5 is a side view illustrating a cooling unit as viewed from an intake chamber (exemplary embodiment 1).

As shown in FIGS. 3 and 4, and FIG. 5 that is a side view illustrating the cooling unit 18 as viewed from the intake chamber 36, a storage 26 for storing electric power generated by the generator-motor 16 and a controller 25 for a hybrid system are arranged in a portion displaced to the outer frame 11 in the intake chamber 36. The storage 26 stores electric power generated by the generator-motor 16. Also, when a driving torque of the engine 15 and the engine 15 needs to be assisted, the storage 26 supplies electric power to a driving motor.

The controller 25 includes controlling devices such as an inverter that converts electric power generated by the generator-motor 16 from alternating current into direct current and converts direct current stored by the storage 26 into alternating current, and a driver that controls an electric equipment for a hybrid systemd. The wirings, the pipes and the like are also not shown in FIG. 5.

A downsized high-capacity capacitor can be used as the storage 26. For example, a small high-capacity capacitor capable of repeating charge and discharge at a high speed, a lithium ion battery, a lithium polymer battery or the like may be used as the storage 26.

The storage 26 is mounted on a plate-shaped portion of a cooling heat sink 24 and is cooled by cooling liquid supplied in the cooling heat sink 24 so that efficiency and lifetime of the storage 26 are not lowered because the storage 26 does not need to work at high temperature. Also, to prevent the controller 25 from heat generation, a cooling passage (not shown) for the cooling liquid delivered from the cooling heat sink 24 is provided in a housing in which the controller 25 is accommodated. The storage 26 and the controller 25 are unitized as an electronic unit 38.

The cooling heat sink 24 may have a plate-like shape as a whole. However, a height position of an edge of the cooling heat sink 24 may be extended to a position substantially the same as a height position of an upper surface of a side frame 6a of the upper swing body frame 6, as shown in a dotted line in FIGS. 4 and 5. In such an arrangement, the storage 26 is accommodated in the cooling heat sink 24. As long as the cooling heat sink 24 is not unnecessarily extended, the controller 25 disposed in an upper portion of the storage 26 can protrude from an upper surface of the upper swing body frame 6. Therefore, the controller 25 can be cooled by outer air sucked in the intake chamber 36 without being blocked by the edge of the cooling heat sink 24. In addition, since the storage 26 can be further downsized, a flow of outer air supplied to the cooling unit 18 is not disturbed even when the electronic unit 38 is arranged in front of the cooling unit 18.

Figure 6:
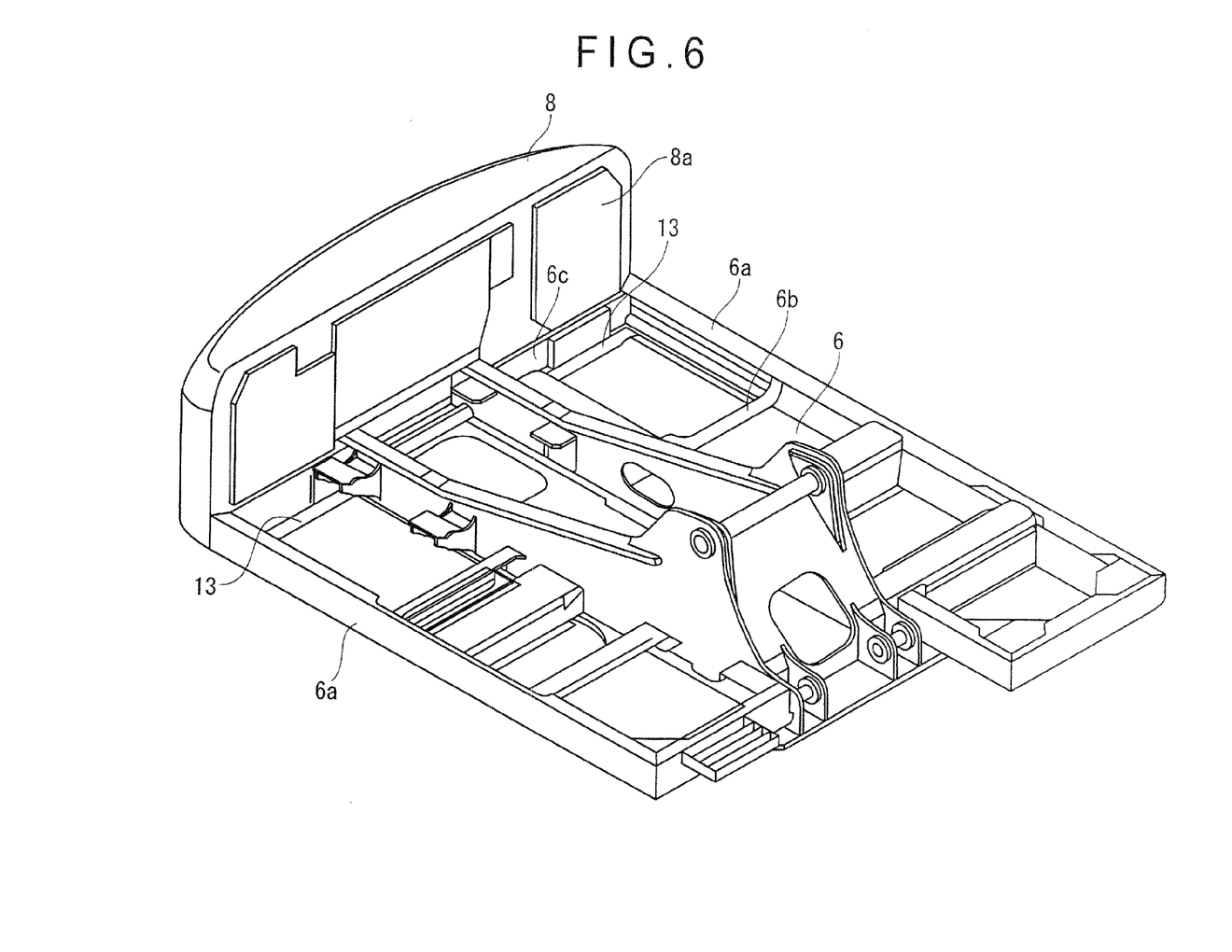
FIG. 6 is a perspective view illustrating a rear side of the hydraulic excavator as viewed from a front side thereof (exemplary embodiment 1).

As shown in FIGS. 2 to 5, the cooling heat sink 24 and the electronic unit 38 are disposed within the side frame 6a of the upper swing body frame 6 and in an upper portion of an under cover 13 formed in a corner of the upper swing body frame 6 (see FIG. 6). FIG. 6 is a perspective view illustrating a rear side of the hydraulic excavator 1 as viewed from a front side thereof. In FIG. 6, the counterweight 8 is attached to the upper swing body frame 6, and the power unit, the cooling unit, the storage and the like are not shown. As shown in FIG. 6, the under cover 13 is attached to the side frame 6a included in the upper swing body frame 6, and is arranged in a bottom portion of the upper swing body frame 6, which is inside the side frame 6a. The electronic unit 38 is arranged within a main frame 30, the side frame 6a, a middle frame 6b, and a rear frame 6c, which form the upper swing body frame 6 (see FIG. 6).

The cooling heat sink 24 is elastically supported to be fixed on the under cover 13 via a buffering member 42. By elastically supporting the cooling heat sink 24, the electronic unit 38 integrated with the cooling heat sink 24 can be less affected by a vibration from the hydraulic excavator 1.

Cooling liquid discharged from a cooling pump 27 disposed in the intake chamber 36 can be supplied to the cooling heat sink 24. The cooling pump 27 and the electronic unit 38 may be assembled, or the cooling pump 27 may be disposed separately from the electronic unit 38.

Figure 7:
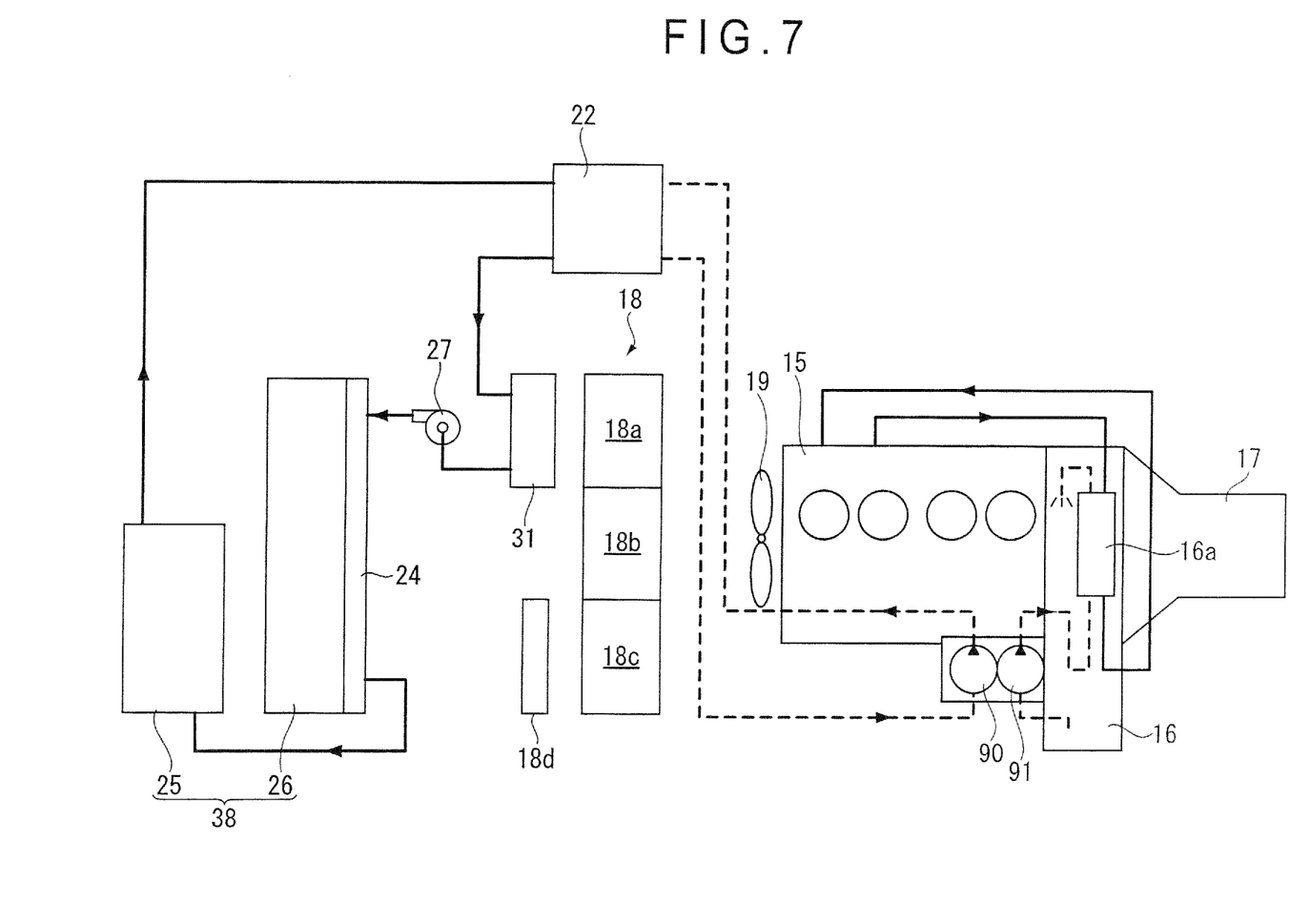
FIG. 7 illustrates a cooling circuit for the hydraulic excavator (exemplary embodiment 1).

FIG. 7 illustrates a cooling circuit. First, the storage 26 is cooled down by cooling liquid supplied to the cooling heat sink 24 from the cooling pump 27. Next, the controller 25 is cooled down by the cooling liquid when the cooling liquid passes through the passage provided in the housing for the controller 25. Then, cooling oil in a swing motor 22 that swings the upper swing body 3 (see FIG. 1) relative to the lower traveling body 2 (see FIG. 1). The swing motor 22 is driven by electric power from the storage 26.

After the cooling liquid cools the cooling oil in the swing motor 22, the cooling liquid is cooled by a radiator 31 disposed in the front of the cooling devices in the hydraulic line such as an engine radiator 18a, an oil cooler 18b, an outer cooler 18c, a fuel cooler 18d and the like. Then, the cooling liquid is directly sucked by the cooling pump 27, and circulates in the above-described cooling circuit. Alternatively, the cooling liquid cooled down by the radiator 31 may be discharged into a tank (not shown), and the cooling liquid in the tank may be sucked by the cooling pump 27. The radiator of the cooling devices on the hydraulic line may serve as the radiator 31 of the above-described cooling circuit.

The cooling oil for cooling a swing motor 22 is supplied by a hydraulic pump 90 driven by the engine 15 via a PTO device, and circulates. Another hydraulic pump 91 is also driven by the engine 15 in the same manner. The hydraulic pump 91 is provided for supplying and circulating the cooling oil for cooling the generator-motor 16. At this time, the oil cooler 16a is provided in the generator-motor 16 and the cooling oil is cooled by an engine cooling liquid from the engine 15 in an oil cooler 16a. In FIG. 7, a circuit of the cooling liquid such as a nonfreezing aqueous solution is shown in a full line and a circuit of the cooling oil is shown in a dotted line.

As shown in FIG. 3, a fuel tank 28, an oil tank 29 and battery box/operating valve 37 for a vehicle having the hydraulic excavator 1 are arranged in a front and right portion of the upper swing body frame 6. The air cleaner 34 and the like are disposed at a left side of the upper swing body frame 6. A central portion of the counterweight 8 is mounted and fixed by fitting into the main frame 30 extending rearward from the upper swing body frame 6 while both end edge portions of the counterweight 8 are supported and fixed by the upper swing body frame 6, the outer frame 11 and the like.

With such an arrangement, the cooling unit 18 and the radiator 31 for controlling electronic devices can be arranged in one place. The flow of air introduced through the intake hole 12 caused by the cooling fan 19 disposed in the shroud 20 can be can be efficiently used. Since the intake chamber 36 is surrounded by the cooling unit 18, the partition 10, the end surface 29a of the oil tank 29, the engine hood 40 and the door 41 included in the outer cover 9, and the wall 8a of the counterweight 8, cooling efficiency of the cooling unit 18 and the radiator 31 can be enhanced by effectively using outer air sucked in the intake chamber 36.

Cooling air that has cooled the cooling unit 18 and the radiator 31 is adjusted to straighten flow by the wind tunnel 21 connected to the shroud 20, so that the engine 15, the generator-motor 16, the main hydraulic pump 17 and the like can be cooled down. Cooling air having a straight flow can be delivered evenly along surfaces of the engine 15, the generator-motor 16, the main hydraulic pump 17 and the like.

The cooling of the engine 15, the generator-motor 16, the main hydraulic pump 17 and the like are conducted not only with the cooling air from the wind tunnel 21, but also with cooling liquid, oil, or the like cooled by the cooling unit 18 as in a conventional method.

The electronic unit 38 that unitizes the storage 26 and the controller 25 can be arranged in a lateral portion of the intake chamber 36. A flow of air sucked in the intake chamber 36 can be supplied to the cooling unit 18 and the radiator 31 without being disturbed by the electronic unit 38.

Also, in the electronic unit 38 that unitizes the storage 26 and the controller 25, the storage 26 can be arranged in the cooling heat sink 24. Thus, the cooling of the storage 26 having a high-calorific power can start with cooling liquid. Accordingly, a cooling efficiency of the electronic unit 38 including the storage 26 and the controller 25 can be considerably enhanced.

Further, since the electronic unit 38 that unitizes the storage 26 and the controller 25, assemblability for disposing the electronic unit 38 on the upper swing body frame 6 can be enhanced. Furthermore, since the electronic unit 38 can be disposed near the generator-motor 16, the wirings can be shortened, and electric power losses due to the wirings can be reduced.

Also, since the cooling pump 27 for supplying cooling liquid to the electronic unit 38 and the generator-motor 22 is disposed in the intake chamber 36 through which cooling air passes, the cooling pump 27 can be cooled.

Second Exemplary Embodiment

Figure 8:
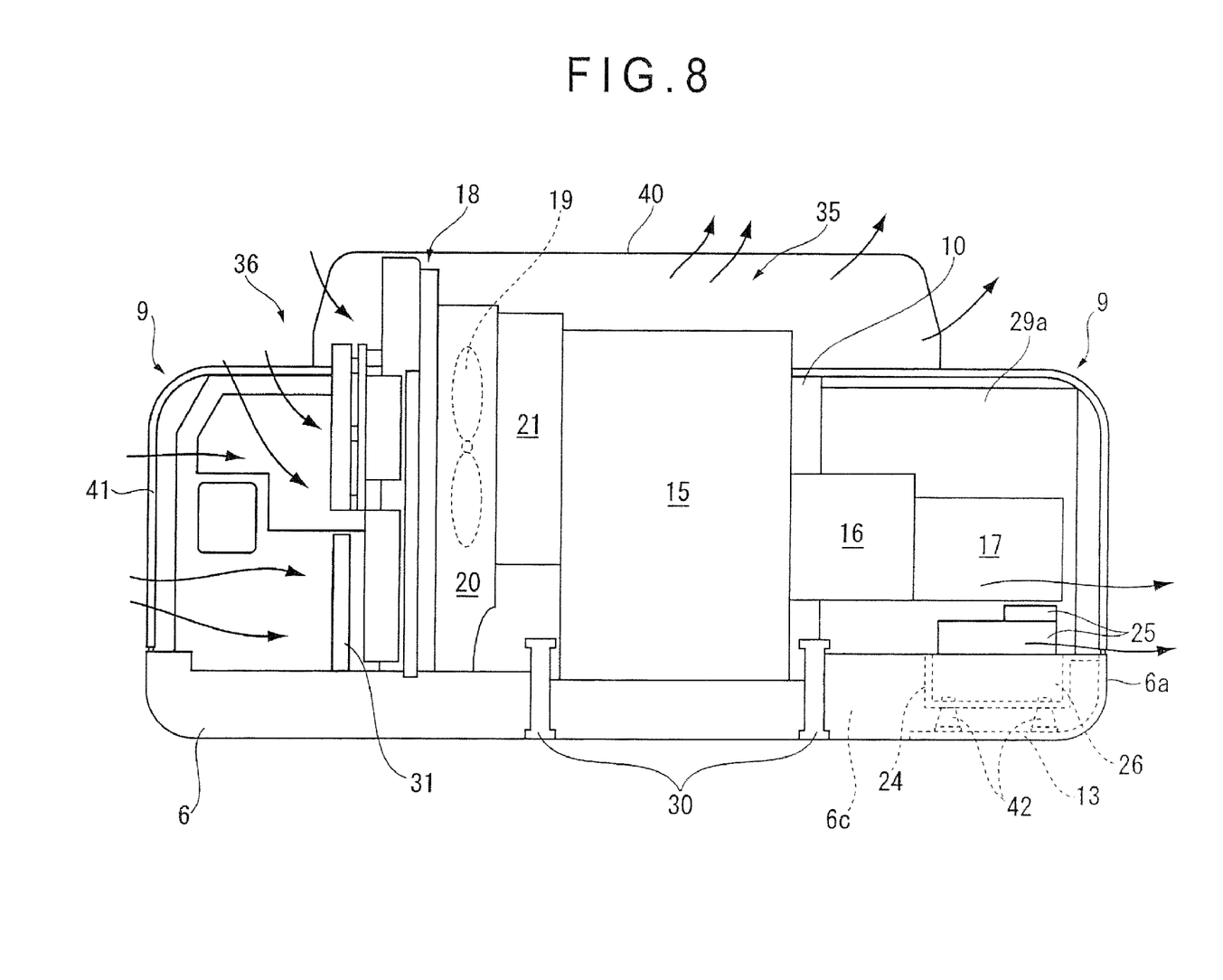
FIG. 8 is a schematic rear view illustrating an engine room (exemplary embodiment 2).

FIG. 8 is a schematic rear view illustrating an engine room showing another exemplary embodiment according to the invention. According to the first exemplary embodiment, the electronic unit 38 is disposed in the intake chamber 36. However, the electronic unit 38 is disposed close to the main hydraulic pump 17 of the power unit according to the second exemplary embodiment. Other components according to the exemplary embodiment are arranged in the same manner as in the first exemplary embodiment. In the following embodiment, the same components as in the exemplary embodiment 1 are denoted by the same reference numerals, and thus detailed description thereof will be hereinafter omitted.

As shown in FIG. 8, the cooling heat sink 24 in which the electronic unit 38 is disposed is arranged on the under cover 13 (see FIG. 6) formed within the side frame 6a of the upper swing body frame 6 in a space under the main hydraulic pump 17. Like the first exemplary embodiment, the electronic unit 38 is arranged in the main frame 30, the side frame 6a, the middle frame (not shown), the rear frame 6c, which form the upper swing frame body 6, according to the second exemplary embodiment.

As shown in a dotted line in FIG. 8, a height position of an upper surface of the cooling heat sink 24 is substantially the same as a height position of an upper surface of the side frame 6a of the upper swing body frame 6. The storage 26 is downwardly settled in the cooling heat sink 24 from above. By downsizing the storage 26, the controller 25, which is disposed in an upper portion of the storage 26, can be positioned to protrude from the upper surface of the upper swing body frame 6 and not to abut on the main hydraulic pump 17. P The cooling heat sink 24 is elastically supported to be fixed on the under cover 13 via the buffering member 42. Cooling liquid discharged from a cooling pump (not shown) that assembles the cooling heat sink 24 and the electronic unit 38 can be supplied to the cooling heat sink 24. The cooling pump may be disposed separately from the electronic unit 38.

In such an arrangement, since the electronic unit 38 can be disposed near the generator-motor 16, the wirings can be shortened and electric power losses due to the line can be reduced.

The storages may be respectively disposed on a lower portion of the intake chamber 36 and a lower portion of the main hydraulic pump 17 by combining arrangements of the first exemplary embodiment and the second exemplary embodiment. Thus, the high-capacity capacitor may be provided as the storage 26.

Third Exemplary embodiment

Figure 9:
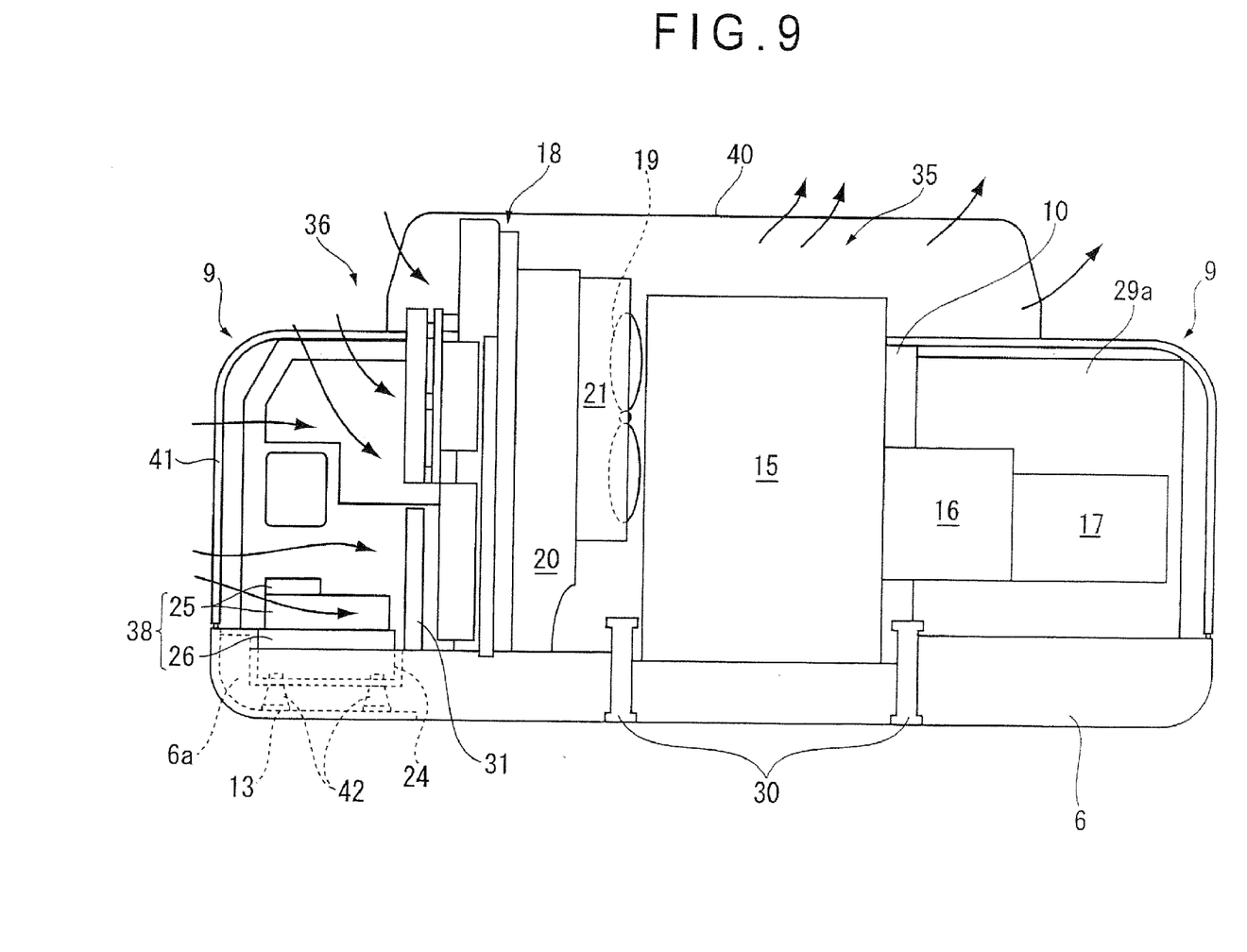
FIG. 9 is a schematic rear view illustrating an engine room (exemplary embodiment 3).

FIG. 9 is a schematic rear view illustrating an engine room showing still another exemplary embodiment according to the invention. In the third exemplary embodiment, the cooling fan 19 driven by the engine 15 is disposed in the wind tunnel 21 such that a part of the cooling fan 19 (approximately ⅓ of the cooling fan 19) is exposed in a space close to the engine 15. According to such an arrangement, cooling air can be effectively sucked and cooling efficiency in the cooling components can be enhanced.

According to such an arrangement, except for that the storage 26, the controller 25, the cooling pump 27 and the radiator 31 for the controller are arranged in the intake chamber 36, and the swing motor 22 is provided as a swing motor of the upper swing body, a conventional arrangement of the hydraulic excavator can be commonly used. Consequently, a manufacturing cost increase of a hybrid hydraulic excavator can be limited.

The invention claimed is:

1. A hybrid working vehicle in which an engine is transversely disposed, comprising:
a power unit including the engine, a generator-motor and a main hydraulic pump, wherein the generator-motor and the main hydraulic pump are disposed in an engine room in which the engine is arranged; and
a storage for storing electric power generated by the generator-motor;
wherein the power unit is provided between (i) a partition for partitioning a front portion of the hybrid working vehicle and the engine room from each other and (ii) a wall of a counterweight facing the engine room; and
wherein the storage is provided at at least one of: (i) a side of the power unit where the engine is arranged, and (ii) a side of the power unit where the main hydraulic pump is arranged, and between the partition and the wall.

2. The hybrid working vehicle according to claim 1, further comprising:
an electronic unit in which the storage and a controller for controlling a motor drive of the hybrid working vehicle are integrated together,
wherein the electronic unit is provided at said at least one of (i) the side of the power unit where the engine is arranged and (ii) the side of the power unit where the main hydraulic pump is arranged.

3. The hybrid working vehicle according to claim 2, wherein:
the electronic unit has a liquid-cooling structure arranged such that cooling liquid cools the storage before cooling the controller.

4. The hybrid working vehicle according to claim 3, further comprising:
a cooling pump for supplying the cooling liquid to the electronic unit,
wherein the cooling liquid discharged from the cooling pump circulates in the cooling structure by passing through a cooling heat sink formed in the storage, passing through the controller, passing through a swing motor that swings an upper swing body relative to a lower traveling body, returning to a radiator, being cooled down by the radiator, and subsequently being sucked by the cooling pump.

5. The hybrid working vehicle according to claim 3, wherein:
a cooling pump for supplying the cooling liquid to the electronic unit is provided in the engine room.

6. The hybrid working vehicle according to claim 5, wherein:
the electronic unit or an assembly of the electronic unit and the cooling pump is supported by a buffering member.

7. The hybrid working vehicle according to claim 5, wherein:
the cooling liquid for cooling the electronic unit circulates through a radiator, and the radiator is provided on an upper stream side of a flow of cooling air relative to a cooling unit having a cooling device on a hydraulic line including the engine.

8. The hybrid working vehicle according to claim 7, wherein:
the radiator is provided between the electronic unit and the cooling unit.

9. The hybrid working vehicle according to claim 2, further comprising:
a radiator for cooling the electronic unit,
wherein the radiator and a cooling device on a hydraulic line are integrated together as a cooling unit.

10. The hybrid working vehicle according to claim 9, wherein:
the power unit, the electronic unit and the cooling unit are horizontally arranged in parallel.

11. The hybrid working vehicle according to claim 9, wherein:
a shroud and a wind tunnel are provided between the cooling unit and the engine, the shroud being arranged further upstream of the wind tunnel with respect to a flow direction of cooling air, and a cooling fan is provided in the wind tunnel such that a part of the cooling fan is exposed at the side of the power unit where the engine is arranged.

12. The hybrid working vehicle according to claim 2, wherein:
the electronic unit is provided in a space surrounded by a main frame, a side frame, a middle frame, and a rear frame, which form an upper swing body frame.

13. The hybrid working vehicle according to claim 1, further comprising a radiator that liquid-cools the storage, wherein the radiator is provided at the side of the power unit where the engine is arranged, and between the partition and the wall.

14. A hybrid working vehicle comprising:
an engine provided to be orthogonal to a main frame along a front-rear direction of the vehicle;
a generator-motor and a main hydraulic pump provided in an engine room in which the engine is arranged;
a cooling unit having a cooling device on a hydraulic line including the engine;
a storage that stores electric power generated by the generator-motor;
a controller that controls a motor drive of the hybrid working vehicle;
a radiator that cools the storage and the controller; and
a cooling fan that generates cooling air to blow the cooling unit and the radiator;
wherein the engine, the generator-motor, and the main hydraulic pump provide a power unit;
wherein the storage is provided between (i) a partition for partitioning a front portion of the hybrid working vehicle and the engine room from each other and (ii) a wall of a counterweight facing the engine room, and at a side of the power unit where the engine is arranged; and
wherein the storage and the controller, the radiator, the cooling unit, the cooling fan, the engine, the generator-motor, and the main hydraulic pump are sequentially arranged, the storage and the controller being arranged furthest upstream and the main hydraulic pump being arranged furthest downstream with respect to a flow direction of the cooling air.

15. The hybrid working vehicle according to claim 14, wherein the radiator liquid-cools the storage, and wherein the radiator is provided at the side of the power unit where the engine is arranged and between the partition and the wall.

* * * * *